United States Patent [19]

Sechrist

[11] Patent Number: 5,376,607

[45] Date of Patent: Dec. 27, 1994

[54] METHOD FOR CONTROLLING MOISTURE BY COKE COMPOSITION

[75] Inventor: Paul A. Sechrist, Des Plaines, Ill.

[73] Assignee: UOP, Des Plaines, Ill.

[21] Appl. No.: 16,211

[22] Filed: Feb. 11, 1993

Related U.S. Application Data

[63] Continuation-in-part of Ser. No. 862,878, Apr. 3, 1992, abandoned, which is a continuation-in-part of Ser. No. 618,131, Nov. 26, 1990, abandoned, which is a continuation-in-part of Ser. No. 437,149, Nov. 16, 1989, Pat. No. 5,001,095.

[51] Int. Cl.$^5$ .................. B01J 38/24; B01J 38/20; B01J 38/44; B01J 8/12

[52] U.S. Cl. .................. 502/48; 208/140; 422/218; 422/220; 422/223; 502/37; 502/49; 502/52

[58] Field of Search .................. 502/35, 36, 37, 48, 502/49, 52; 208/140, 165–173

[56] References Cited

U.S. PATENT DOCUMENTS

| | | | |
|---|---|---|---|
| 2,897,157 | 7/1959 | Goddard | 502/46 |
| 3,020,240 | 2/1962 | Lockett, Jr. | 502/37 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,987,150 | 8/1976 | McWilliams, Jr. | 208/171 |
| 4,859,643 | 8/1989 | Sechrist et al. | 502/37 |
| 4,880,604 | 11/1989 | Koves | 422/220 |
| 4,959,198 | 9/1990 | Koves | 422/220 |
| 5,001,095 | 3/1991 | Sechrist | 502/41 |

OTHER PUBLICATIONS

*Applied Catalysis* 19, 1985, pp. 203–206, Authored by: J. N. Beltramini, E. J. Churin, E. M. Traffano and J. H. Parera.

*Industrial Engineering Chemistry, Process Design Development,* 1986, vol. 25, No. 3, pp. 626–630, Authored by: Guang-xun Wang, Shi-xiong Lin, Wei-Jian Mo, Chun-lan Peng, and Guang-hua Yang.

*Primary Examiner*—Paul E. Konopka
*Attorney, Agent, or Firm*—Thomas K. McBride; John G. Tolomei

[57] ABSTRACT

A semi-continuous process for combusting coke from catalyst particles in a fixed bed is improved by rejecting from the combustion process a high moisture content flue gas stream which is produced by the combustion of a relatively large proportion of the hydrogen in the coke that enters the combustion section during an early stage of combustion. By operating the early stage of combustion at conditions to increase the rate of combustion of the hydrogen in the coke relative to that of the carbon in the coke, the overall equilibrium level of water in a flue gas/recycle gas that circulates through the process is lowered. The high moisture content flue gas stream from the early stage of combustion is rejected separately from the process. Subdivision of the bed and separation of the flue gas streams can be easily accomplished in a vertically arranged catalyst particle bed by adding baffles to the recycle gas distribution space that subdivide the distribution space into separate chambers and by adding baffles to the flue gas collection space that subdivide the collection space into separate chambers. The amount of high moisture content flue gas withdrawn from the process can be equal to the amount of the make-up gas streams entering the flue gas/recycle gas loop.

16 Claims, 2 Drawing Sheets

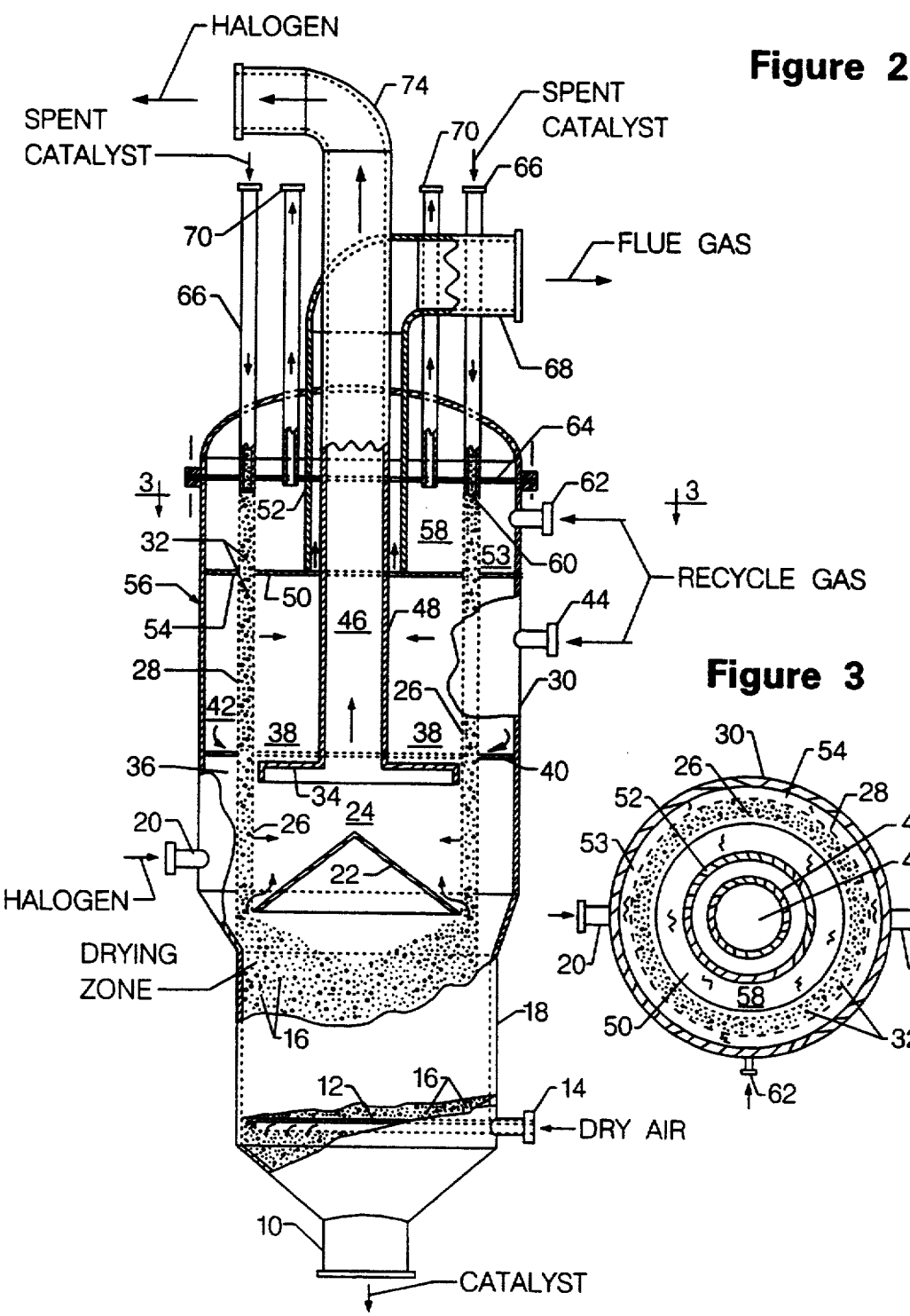

METHOD FOR CONTROLLING MOISTURE BY COKE COMPOSITION

CROSS-REFERENCE TO RELATED APPLICATIONS

This application is a continuation-in-part application of U.S. Ser. No. 862,878 filed on Apr. 3, 1992, now abandoned, which is a continuation-in-part application of U.S. Ser. No. 618,131 filed on Nov. 26, 1990 and now abandoned which is a continuation-in-part application of U.S. Ser. No. 437,149 filed on Nov. 16, 1989 and issued on Mar. 19, 1991 as U.S. Pat. No. 5,001,095.

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to combust coke in a typical regeneration zone, a recycle gas is continuously circulated to a combustion section and a flue gas containing by-products of coke combustion, oxygen and water is continually withdrawn. Coke combustion is controlled by recycling a low oxygen concentration gas into contact with the coke-containing catalyst particles. The flue gas/recycle gas is continuously circulated through the catalyst particles. A small stream of make-up gas is added to the recycle gas to replace oxygen consumed in the combustion of coke and a small amount of flue gas is vented off to allow for the addition of the make-up gas. The steady addition of :make-up gas and the venting of flue gas establishes a steady state condition that produces a nearly constant concentration of water and oxygen in the recycle gas.

In a continuous or semi-continuous regeneration process, coke laden particles are at least periodically added and withdrawn from a bed of catalyst in which the coke is combusted. Regions of intense burning that extend through portions of the catalyst bed develop as the coke is combusted.

One problem associated with localized regions of intense coke combustion is catalyst deactivation. The combination of temperature, water vapor, and exposure time determine the useful life of the catalyst. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded.

INFORMATION DISCLOSURE

U.S. Pat. No. 3,652,231 (Greenwood et al.) shows a regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with regeneration of reforming catalyst. The teachings of patents ('231, '680, and '496) are hereby incorporated in full into this patent application.

The kinetics of the combustion of carbon and hydrogen in coke deposits on zeolite-type cracking catalysts are described in the article authored by G. Wang, et al., in "Industrial Engineering Chemistry, Process Design and Development", Vol. 25, No. 3, 1986, pages 626–630. FIG. 9 of this article by Wang, et al., indicates that in the temperature range of 1112°–1292° F. (600°–700° C.) of combustion, almost all of the hydrogen in the coke will be burnt out before the burning of the carbon in the coke will have attained 85%.

The combustion of coke deposits on $Pt/Al_2O_3$ catalysts used in naphtha reforming is described in the article authored by J.N. Beltramini, et al., in "Applied Catalysis," 19, (1985), pages 203–206. This article by J.N. Beltramini, et al., teaches that the burning of the coke starts with the coke deposited on the platinum because of the catalytic action of platinum and because the coke deposited on the platinum is relatively rich in hydrogen. With an increase in temperature, the coke deposited on the support which is near the platinum is burnt by oxygen spillover from the platinum. Finally, the last part of the coke to burn is that most distant from the platinum, which comprises the coke deposits that are relatively poor in hydrogen.

SUMMARY OF THE INVENTION

It has been discovered that the removal of moisture from a combustion section of a regeneration zone will produce geometric increases in the life of a typical reforming catalyst. In order to take advantage of this extended catalyst life, a moisture removal method that can be readily integrated into existing regeneration processes without large capital expenditures or greatly increased complexity for the system is provided. This invention is in one of its broad aspects a method of controlling the water content in the combustion section of a regeneration zone by making inexpensive alterations to the arrangement and operation of the combustion section in the regeneration zone. This invention selectively burns a relatively large proportion of the hydrogen-rich coke that enters the combustion section during an early stage of coke combustion and produces a flue gas stream having a relatively high moisture content that is vented from the process. The remaining coke is combusted in later stages of combustion. The flue gas from the early stage of combustion is vented independently from the process without any substantial contact with flue gas from later stages of combustion.

The operating conditions of the early stage are selected independently to selectively combust a relatively large proportion of the hydrogen-rich coke. And the operating conditions of the early stage may be further independently optimized to increase the rate of venting of the relatively high moisture content flue gas stream from the early stage of combustion. This invention's method of combustion of a relatively large proportion of the hydrogen-rich coke has a significant and beneficial synergism with other moisture removal means. Since a high proportion of the hydrogen in the coke is combusted in the early stage of combustion, as a result most of the water produced by the combustion of hydrogen in the coke is contained in the flue gas that exits the early stage of combustion. By venting the high moisture content flue gas stream independently of the flue gas from later stages of combustion, the amount of water is reduced in the flue gas from the later stages of combustion that is mixed with make-up gas to form the recycle gas. Therefore, the overall equilibrium concentration of water in the circulating flue gas/recycle gas is kept at a low level.

In a typical regeneration process as currently commercially practiced, the recycle gas will have a moisture content of about 5-6 mol percent. By practicing this invention in which a high proportion of the hydrogen in the coke is combusted in an early stage of combustion, this moisture content in the recycle/make-up gas stream may be reduced to 1-2 mol percent. Thus, the method of this invention can significantly reduce the moisture content in the combustion section thereby improving catalyst performance.

Accordingly, this invention is in one embodiment a method of reducing the water concentration during the combustion of coke in a process for removing coke from catalyst particles in a combustion section of a regeneration zone through which the particles move in at least semi-continuous flow. The method includes passing catalyst particles containing coke deposits into a regeneration zone and withdrawing regenerated catalyst particles from the regeneration zone. An elongated bed of the particles is formed in a combustion section of the regeneration zone. The bed of particles has two elongated sides for transverse gas flow through the bed. Periodically the particles are moved through the combustion section by withdrawing combusted catalyst particles from an outlet end of the bed and adding catalyst particles containing coke deposits to an inlet end of the bed. A first portion of an oxygen-containing recycle gas stream is passed through a first portion of the first elongated side and through the bed at conditions to combust at least a portion of the hydrogen contained within the coke and produce a first flue gas stream comprising by-products of coke combustion including water. The first flue gas stream passes through a first portion of the second elongated side and is withdrawn from the regeneration zone. At least a portion of the first flue gas stream is rejected from the process. A second portion of the oxygen-containing recycle gas stream is passed through a second portion of the first elongated side and through the bed at conditions to combust at least a portion of the coke and produce a second flue gas stream comprising by-products of coke combustion including $CO_2$. The second flue gas stream passes through a second portion of the second elongated side and is withdrawn from the regeneration zone without substantial contact with the first flue gas stream. At least a portion of the second flue gas stream is combined with a first make-up gas stream to form at least a portion of the recycle gas stream.

In another aspect, this invention is an apparatus for the regeneration of catalyst particles. The apparatus includes a regeneration vessel and a particle inlet conduit located at the top of the regeneration vessel for transferring catalyst particles into the regeneration vessel. An inlet particle retaining member and an outlet particle retaining member are positioned in a vertically coextensive and horizontally offset arrangement inside the regeneration vessel to define a vertically extending particle retaining space. The inlet particle retaining member and the outlet particle retaining member have perforated walls which permit the flow of gas through the walls but which restrict the flow of particles through the walls. The particle retaining space has an upper end that communicates with the particle inlet conduit and a lower end that communicates with the particle outlet conduit. The particle retaining space communicates with a first gas distribution chamber, a first gas collection chamber, a second gas distribution chamber, and a second gas collection chamber. The first gas distribution chamber, which is defined in part by an upper portion of the inlet particle retaining member, communicates with the particle retaining space by the transfer of gas across the upper portion of the inlet particle retaining member. The first gas distribution chamber also communicates with a means defining a first recycle gas inlet. The first gas collection chamber, which is defined in part by an upper portion of the outlet particle retaining member, communicates with the particle retaining space by the transfer of gas across the upper portion of the outlet particle retaining member. The first gas collection chamber also communicates with a means defining a first flue gas outlet. The second gas distribution chamber, which is defined in part by a lower portion of the inlet particle retaining member, is located below the first gas distribution chamber and communicates with the particle retaining space by the transfer of gas across the lower portion of the inlet particle retaining member. The second gas distribution chamber also communicates with a means defining a second recycle gas inlet. The second gas collection chamber, which is defined in pan by a lower portion of the outlet particle retaining member, is located below the first gas collection chamber and communicates with the particle retaining space by the transfer of gas across the lower portion of the outlet particle retaining member. The second gas collection chamber also communicates with a means defining a second flue gas outlet.

Other objects, embodiments and details of this invention are presented in the following detailed description of the invention.

BRIEF DESCRIPTION OF THE DRAWINGS

FIG. 2 is a partial cross-sectional elevation of the regeneration zone shown in FIG. 1.

FIG. 3 is a section of the regeneration zone taken across line 3—3 of FIG. 2.

DETAILED DESCRIPTION OF THE INVENTION

Figure 1:
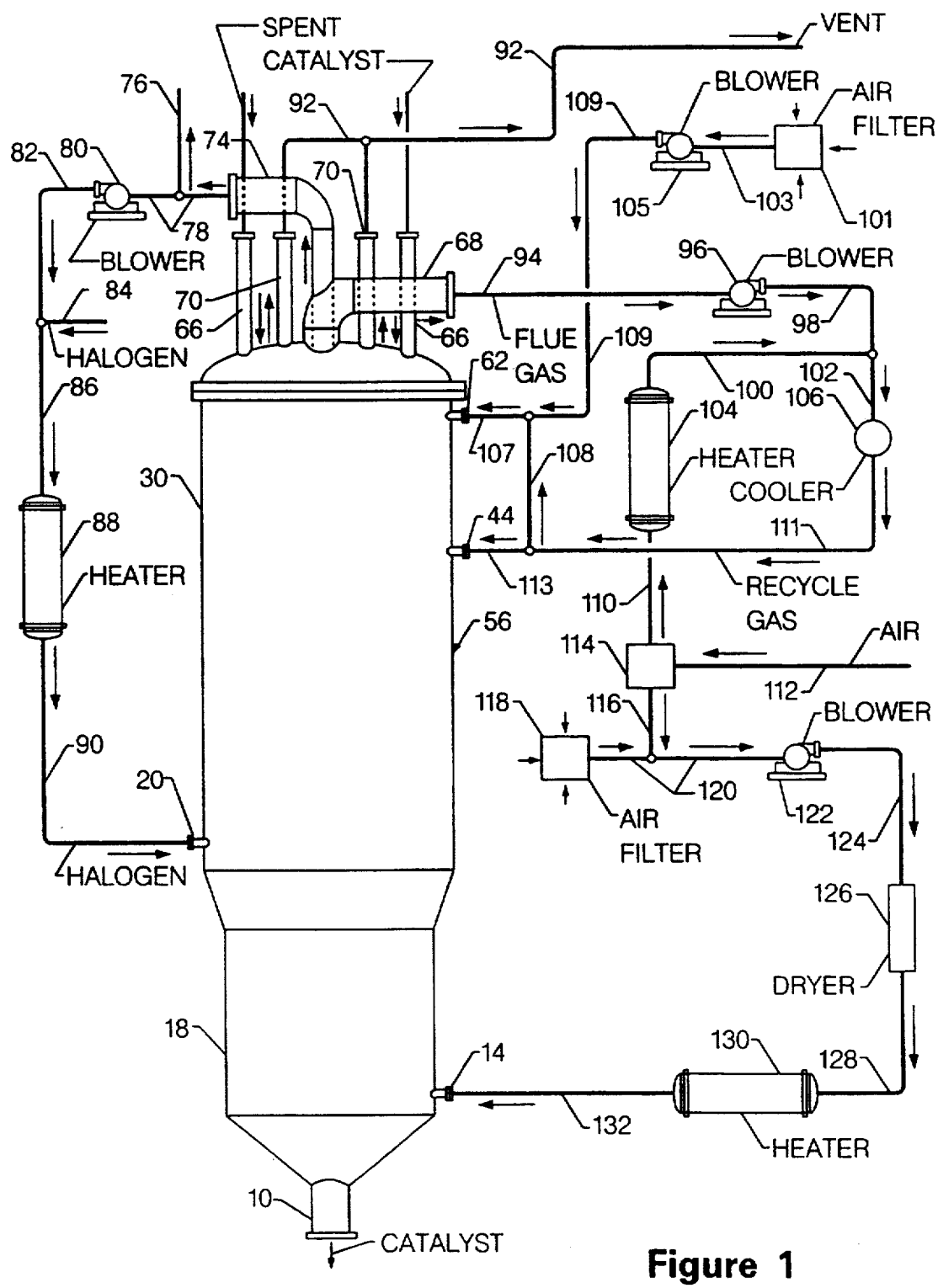
FIG. 1 is a schematic illustration of a regeneration zone and some of the equipment associated therewith.

In its broadest terms, this invention can be used to reduce the concentration of water in any process that consumes oxygen and produces water as a by-product. One such application that requires reduction of water concentration is in the removal of coke from catalyst particles in a regeneration zone. The coke is oxidized at high temperatures to form carbon dioxide, carbon monoxide and water. Temperatures for coke combustion are generally in excess of 700° F. (370° C.). In this reaction, a high water content, over time, has a deleterious effect on the activity of the catalyst. With continued exposure to high temperatures in a high moisture content environment, the catalyst will lose surface area and as a result become permanently deactivated. However, it is not necessary to limit this invention to coke combustion or regeneration processes since it may be generally applicable to other processes that use a recycle stream to supply a low oxygen concentration gas to an oxygen-consuming and water-producing reaction.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. It has been discovered that removal of moisture from a combustion section for a reforming catalyst will produce a more than linear increase in the life of a typical reforming catalyst. The particles are usually spheroidal and have a diameter of from about 1/16th to about ⅛th inch (1.5-3.1 mm), though they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In a preferred form, the reformer will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to gas continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a batch, continuous, or semi-continuous catalyst regeneration process, catalyst is contacted with a hot oxygen-containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. On an overall basis, hydrogen generally comprises between about 0.5-10 percent of the overall weight of coke. Coke is generally comprised of a variety of compounds of varying hydrogen-to-carbon (H/C) ratios. The above-mentioned article by J.N. Beltramini, et al., teaches that the hydrogen-to-carbon ratios of coke compounds deposited on catalytic reforming catalysts comprising platinum and alumina are from about 0.5 to about 0.7 H/C molar ratio. In practice, these ratios are a function of the platinum content of the catalyst, which varies from one catalyst to another, and so these ratios may vary more generally from 0.4–1.0. The above-mentioned article by J.N. Beltramini, et al., also teaches that coke that is hydrogen-rich generally deposits onto the catalyst at and relatively near to the platinum sites, whereas the remaining coke that is not hydrogen-rich generally deposits on the alumina support and relatively distant from the platinum sites. Although the above-mentioned article by J.N. Beltramini, et al., does not explicitly define the term "rich" with reference to the hydrogen content of the coke, as used herein the term "hydrogen-rich" is intended to indicate a hydrogen-to-carbon molar ratio of the subject coke compound or class of coke compounds on a catalyst that is at least 25% greater than the weighted average hydrogen-to-carbon ratio of all the coke deposits on a catalyst. The hydrogen-to-carbon ratios of coke deposits on a catalyst can be measured by the analytical methods described in the article by R. Bacaud, et al., in "Applied Catalysis," 1, (1981), pages 81-92.

The mechanism of coke removal is oxidation to carbon monoxide, carbon dioxide, and water. The coke content of spent catalyst may be as much as 20% by weight of the catalyst weight, but 5-7% is a more typical amount. Within the combustion section, coke is usually oxidized at temperatures ranging from 900° to 1000° F. (480° to 540° C.), but temperatures in localized regions may reach 1100° F. (590° C.) or more. Oxygen for the combustion of coke enters what is called a combustion section of the regeneration zone in what has been termed a recycle gas. The recycle gas contains a low concentration of oxygen usually on the order of 0.5 to 1.5% by volume.

The catalyst particles in the combustion section of the regeneration zone are typically contained in an elongated bed having two elongated sides. The two elongated sides are open for transverse gas flow through the catalyst bed. Catalyst particles move axially along the bed by withdrawing catalyst particles depleted in coke deposits by combustion from the outlet end of the bed and adding catalyst particles containing coke deposits to the inlet end of the bed. Catalyst that is withdrawn from the combustion zone is termed combusted catalyst. The coke content of the combusted catalyst may be 0.01% by weight of the catalyst weight or less, but generally it is approximately 0.2% by weight or less.

The majority of the description of the embodiments of this invention is presented in terms of both elongated sides of the bed in the combustion section having both a first and a second portion, since conventionally the two elongated sides will consist of two portions. A first portion of the recycle gas passes through the first portion of the first elongated side and through the bed, where a first flue gas stream is produced that is passed through the first portion of the second elongated side. A second portion of the recycle gas passes through the second portion of the first elongated side and through the bed, where a second flue gas stream is produced that is passed through the second portion of the second elongated side. Generally, the first portions of both elongated sides are at the inlet end of the catalyst bed where the catalyst particles containing coke deposits enter the bed whereas the second portions of both elongated sides are at the outlet end of the catalyst bed where combusted catalyst particles are withdrawn from the bed. In general, the total recycle gas is the total of the portions of the recycle gas passed through the first elongated side of the bed. For example, in this description where the elongated sides of the bed in the combustion section consist of two portions, the total recycle gas is the total of the first portion of recycle gas and the second portion of recycle gas. However, this description is not intended to limit the scope of this invention to any particular arrangement. Thus, as an example, one arrangement may comprise three or more portions of recycle gas passing through three or more corresponding portions of the first elongated side.

When using the method of this invention, a first portion of the recycle gas is passed through a first portion of the first elongated side and through the catalyst bed operated at first combustion conditions effective to combust at least a portion of the hydrogen contained within the coke. The first combustion conditions generally include a temperature of from about 260° to about 400° C. and an oxygen concentration of from about 0.5 to about 2.0% by volume oxygen. Flue gas may be made up of carbon monoxide, carbon dioxide, water and unreacted oxygen and other non-reactive gases. Flue gas produced in the bed that is passed through the first portion of the second elongated side and subsequently withdrawn from the regeneration zone is termed first flue gas.

A second portion of the recycle gas is passed through a second portion of the first elongated side and through the catalyst bed operated at second combustion conditions effective to combust at least a portion of the coke. The second combustion conditions generally include a temperature of from about 370° to about 510° C. and an oxygen concentration of from about 0.5 to about 1.5% by volume oxygen. Hue gas may be made up of carbon monoxide, carbon dioxide, water and unreacted oxygen and other non-reactive gases. Hue gas produced in the bed that is passed through the second portion of the second elongated side and subsequently withdrawn from the regeneration zone is termed second flue gas.

When using the method of this invention, the first and second operating conditions are selected independently. The first combustion conditions are selected to selectively combust a relatively large proportion of the hydrogen-rich coke in the first portion of the combustion section so that a relatively small proportion of the hydrogen-rich coke combusts in the second portion of the combustion section. Consequently, a high proportion of the hydrogen in the coke combusts in the first portion of the combustion section and a relatively low proportion of the hydrogen in the coke combusts in the second portion of the combustion section.

Temperature is an important operating variable in selectively combusting the hydrogen-rich coke. For purposes of illustration, a sample of coked reforming catalyst may be exposed to a gas stream having a suitable flow rate and a suitable oxygen concentration for a suitable residence time but at two different temperatures. At a temperature of between 260° C. to 400° C., only a portion of the hydrogen in the coke is combusted compared to at 450° C. to 510° C. where approximately all of the coke—hydrogen-rich and otherwise—is combusted. The former temperatures are an example of the temperatures of the first operating conditions of the present invention, whereas the latter temperatures are an example of the practice of the prior art in which all of the hydrogen in the entering coke combusts in one combustion section. Since water is produced by the combustion of hydrogen, then, consequently, the flue gas/recycle gas of the second combustion section of the present invention contains significantly less water than the flue gas/recycle gas of the single combustion section of the prior art. When using the method of the present invention, therefore, most of the water produced by the combustion of hydrogen in the coke is contained in the first flue gas, and the amount of water in the second flue gas is reduced. It is an objective of the present invention to reduce the amount of water in the second flue gas. Passing catalyst particles containing coke through first combustion conditions at a relatively lower temperature than that of the second combustion conditions is a simple and yet significantly effective way of reducing the water in the combustion section.

The presence of combustion promoters on the catalyst is another important factor in selectively combusting the hydrogen-rich coke. However, the presence of combustion promoters on the catalyst is not an essential feature of the broad embodiment of this invention. Nevertheless, such promoters can increase the rate of combustion of the hydrogen-rich coke, or, alternatively, can lower the temperature at which the hydrogen-rich coke combusts. Although promoters that promote the combustion of only hydrogen-rich coke are preferred, such promoters generally promote the combustion of coke that is not hydrogen-rich, too. Nevertheless, by allowing the temperature of combustion to be lowered, a promoter can shift the relative rates at which the combustion of hydrogen-rich coke and coke that is not hydrogen-rich occur. The above-mentioned article by Wang, et al., teaches that in coke the activation energy of the combustion of hydrogen-rich species is smaller than the activation energy of the combustion of species that are not hydrogen-rich, and so reducing the temperature by the use of a promoter generally increases the rate of combustion of hydrogen-rich coke relative to coke that is not hydrogen-rich. Therefore, even a promoter that promotes not just the combustion of hydrogen-rich coke but the combustion of coke that is not hydrogen-rich coke as well is useful for preferentially combusting the hydrogen-rich coke because more of the total coke will burn at low temperature. A catalyst comprising a combustion promoter is therefore a preferred embodiment of this invention. Combustion promoters are well-known to those skilled in the art. Combustion promoters that are suitable for this invention include the transition metal oxides such as oxides of chromium or tin.

The present invention is particularly well-suited to the regeneration of coked reforming catalyst. The above-mentioned article authored by J.N. Beltramini, et al., teaches that at a given set of combustion conditions in which temperature is the only operating variable, the coke that burns at the lowest temperature is the coke that is relatively rich in hydrogen. This is in part because the coke that is rich in hydrogen is generally deposited on the platinum, which has a well-known catalytic action for promoting combustion of all coke, hydrogen-rich and otherwise. Therefore, platinum plays two important roles—first, in the selective catalytic combustion of the hydrogen-rich coke, and second, in the preferential deposition of the hydrogen-rich coke on the platinum.

The role of preferential deposition of the hydrogen-rich coke on the platinum in the selective catalytic combustion of the hydrogen-rich coke can be illustrated by comparing two different catalysts containing coke. One of the catalysts is a typical commercial reforming catalyst comprising alumina and platinum, whereas the other is the same commercial reforming catalyst but without the platinum or any other Group VIII noble metal. As those skilled in the art know, the former platinum-containing catalyst is much preferred as a reforming catalyst than the catalyst without platinum. However, the purpose of this illustration is not to compare the reforming performance of the two catalysts, but instead the effect of preferential coke deposition on the selective combustion of hydrogen-rich coke. Based on the teachings in the above-mentioned article by J.N. Beltramini, et al., the hydrogen-rich coke compounds are preferentially deposited on the platinum. Therefore, when the two coked catalysts are exposed to a gas stream having a suitable flow rate and a suitable oxygen concentration for a suitable residence time at a suitable temperature, more of the hydrogen in the coke on the catalyst comprising platinum will be combusted than the hydrogen in the coke on the catalyst without platinum. The difference in the amount of hydrogen in the coke that is combusted on each catalyst is due to the preferential deposition of hydrogen-rich coke on the platinum and the catalytic combustion of that coke by the platinum.

One objective of the present invention is to combust a relatively large proportion of the hydrogen-rich coke in the first portion of the combustion section, so that a much smaller proportion of the hydrogen-rich coke remains to be combusted in a second portion of the combustion section. With a reforming catalyst containing platinum, preferential deposition and catalytic combustion of hydrogen-rich coke can, therefore, be used to further increase the proportion of hydrogen-rich coke that combusts in the first portion of the combustion section. Since more water is produced by the combustion of hydrogen-rich coke than by the combustion of coke that is not hydrogen-rich, then, consequently, the water content of the flue gas/recycle gas of the second combustion section is significantly less where the hydrogen-rich coke is preferentially deposited on and catalytically combusted by platinum.

Platinum is not the only metal that exhibits the dual characteristics of preferentially depositing and subsequently catalyzing the combustion of hydrogen-rich compounds. It is believed that the other noble metals that belong to Group VIII of the Periodic Table also exhibit these characteristics. Therefore, one embodiment of the present invention is one in which the catalyst comprises at least one of the Group VIII noble metals (e.g., ruthenium, rhodium, palladium, iridium and platinum. The catalyst preferably comprises platinum.

The oxygen concentration at first combustion conditions may be less than or equal to that at second combustion conditions, but preferably the oxygen concentration is significantly higher at first combustion conditions than at second combustion conditions. Although high oxygen concentrations are generally associated in the prior art regeneration processes with high combustion temperatures that may permanently damage the select catalytic and physical properties of the catalyst, the method of this invention avoids these detrimental effects because of the relatively low temperatures of the first combustion conditions. Thus, the relatively low temperatures and the relatively high oxygen concentration together promote the combustion of hydrogen in the coke at first combustion conditions. Furthermore, unlike the prior art regeneration processes, not all of the oxygen passed to the portion of the bed where the catalyst particles containing coke deposits enter is consumed. Although an abundant amount of coke is present, the first combustion conditions are selected to preferentially combust the hydrogen in the coke. Since most of the entering coke is carbon, most of the coke is not combusted at first combustion conditions. Therefore, even if the first portion of recycle gas contains a stoichiometric excess of oxygen at a relatively high concentration, most of the entering coke will not combust and most of the oxygen in the combined stream will pass unconsumed through the first portion of the first elongated side and the bed. The excess oxygen will pass through the first portion of the second elongated side as part of the first flue gas. Thus, passing a gas containing a relatively high concentration of oxygen through the first portion of the first elongated side will not have a significant detrimental effect on the catalyst at first combustion conditions.

The higher oxygen concentration of the first combustion conditions relative to the second combustion conditions may be achieved by combining the first portion of the recycle gas stream with an additional oxygen-containing gas stream and passing the combined stream through the first portion of the first elongated side and through the bed. Gas that is combined with the first portion of the recycle gas stream and passed through the first portion of the first elongated side is termed second make-up gas. An oxygen-containing second make-up gas stream may have an oxygen concentration that is less or more than ambient air, but preferably it is the same as ambient air. A preferred oxygen-containing second make-up gas is air because it is suitable and convenient to use. Passing a combined stream of unheated, ambient air and the first portion of the recycle gas may be a particularly economical means of both raising the oxygen concentration and lowering the temperature of the combined stream gas that enters the first portion of the first elongated side relative to the recycle gas that enters the second portion of the first elongated side.

As mentioned above, the second make-up gas stream may contain oxygen. However, this invention is not limited to second make-up gas streams that contain oxygen. Where 2the second make-up gas stream does not contain oxygen, the concentration of oxygen at first combustion conditions will be less than the concentration of oxygen at second combustion conditions. There are some advantages to lowering the concentration of oxygen in the second make-up gas stream. For example, by decreasing the concentration of oxygen in the second make-up gas, a larger quantity of second make-up gas must be added to the process in order to maintain a given oxygen concentration at first combustion conditions. The water concentration at first combustion conditions depends on the amount of water in the second make-up gas, the amount of water in the recycle gas, and the amount of water formed by combustion of coke per pass of gas flowing through the first combustion zone. So, the addition of more second make-up gas results in the passing of more first flue gas out of the first portion of the second elongated side of the bed and decreases the water concentration at first combustion conditions. There is also a disadvantage to lowering the concentration of oxygen in the second make-up gas stream, namely that the area of the screens in the first combustion zone that retain the catalyst in the bed may have to be increased. As the concentration of oxygen decreases, more gas must flow through the screens of the first combustion zone in order to provide a given amount of oxygen to burn a given amount of coke. As this quantity of gas flowing through the first combustion zone increases, the area of the screens may have to be increased for hydraulics purposes.

The second make-up gas may comprise any suitable gas selected from gases which exhibit the primary requirements of diluting the water content in the first flue gas and not being detrimental to the catalyst at first combustion conditions and which are otherwise convenient to use. Suitable gases include nitrogen, carbon dioxide, helium, neon, argon, oxygen, air, and mixtures thereof. Air that is enriched with either oxygen or nitrogen may be a suitable second make-up gas, and a number of commercially available processes using selective adsorbents or gas permeable membranes are available to generate such streams. Such processes are shown in U.S. Pat. Nos. 4,787,919 and 3,830,733, the teachings of which are herein incorporated by reference. It should be understood that the above-mentioned gases are not necessarily equivalent in their effectiveness. The choice of second make-up gas will depend on several considerations, including its oxygen concentration, heat capacity, and cost.

In general, a separate flue gas stream passes through each portion of the second elongated side of the catalyst bed in the combustion section. The total flue gas is the total of the portions of flue gas passed through the second elongated side of the bed. For example, in this description where the elongated sides of the bed in the combustion section consist of two portions, the total flue gas produced in the combustion section is the total of the first flue gas stream and the second flue gas stream. Again, however, this description is not intended to limit the scope of this invention to any particular arrangement.

There is no substantial contact of the first flue gas stream with the second flue gas stream. This is because a high proportion of the hydrogen in the coke is combusted at first combustion conditions and most of the water produced by the combustion of hydrogen in the coke is contained in the first flue gas. By keeping the high moisture content first flue gas separate from the second flue gas and venting the first flue gas from the regeneration zone, the amount of water in the second flue gas is reduced. Therefore, the overall equilibrium concentration of water in the circulating flue gas/recycle gas is kept at a low level.

In an embodiment of this invention, the recycle gas along with at least a portion of the first flue gas and the second flue gas form what is termed a recycle gas loop. In the recycle gas loop, flue gas is continually withdrawn from the combustion section, mixed with an oxygen-containing gas to replenish consumed oxygen, and returned to the combustion section as recycle gas. Flue gas that is rejected from the process allows the addition of an oxygen-containing gas called first make-up gas. The first make-up gas is combined with at least a portion of the first flue gas and the second flue gas to replace the oxygen consumed by the coke combustion and the combined gas is recycled to the combustion section as recycle gas.

In this recycle gas loop, the main exit for the water from the process is with the flue gas that is rejected from the process. Therefore, the water concentration in the recycle loop depends on the difference between the amount of water entering with the first make-up gas and the second make-up gas streams and the amount of water leaving with the rejected stream. At steady conditions, this difference equals the amount of water produced during the combustion of coke, and an equilibrium water concentration in the recycle loop is achieved. The water circulating within the recycle gas loop creates a constant steam concentration during the coke combustion process. In the present invention, a substantial portion of the water produced during the combustion of coke exits the process with the first flue gas and is not circulated. In contrast, in the prior art processes, a substantial proportion of the water produced is circulated. Consequently, the water concentration in the recycle loop is higher in the prior an processes than in the present invention.

The water content in the recycle loop could be lowered by drying the air that makes up the first make-up gas or the second make-up gas or by installing a drier for the gas circulating in the recycle gas loop. Due to the relatively low native moisture content of the make-up gas, drying the first make-up gas stream and the second make-up gas stream would not significantly reduce the water in the recycle gas loop. Due to the large volume and high temperature of the recycle gas, recycle gas drying would be expensive and difficult to carry out.

In a preferred embodiment of this invention to reduce the water concentration during the coke combustion process, all of the first flue gas is rejected directly from the :process and all of the second flue gas is combined with first make-up gas and is recycled to the combustion section as recycle gas. Since a high proportion of the hydrogen in the coke is combusted at first combustion conditions, most of the water produced by the combustion of hydrogen in the coke is contained in the first flue gas. By rejecting all of the first flue gas, most of the water produced by the combustion of hydrogen in the coke is removed from the recycle gas loop. And, by recycling only the second flue gas, less of the water produced by the combustion of hydrogen in the coke is recycled in the recycle gas loop. Consequently, the smaller recirculation of water in the recycle gas loop via the first flue gas lowers the water concentration in the recycle gas loop.

The amount of high moisture content first flue gas can vary. Generally, the amount of first flue gas is between about 5 to about 30% by weight of the total flue gas, which in this description is the total of the first flue gas and the second flue gas. Generally, all of the first flue gas is rejected from the process. The amount of first flue gas that is rejected from the process is generally approximately equal to the total of the amount of first make-up gas and second make-up gas that is added to the process.

Withdrawing more first flue gas than will be rejected from the process requires the unrejected portion of the first flue gas stream to be recycled as part of the recycle gas stream. Recycling the unrejected portion of the first flue gas stream in this manner requires additional piping and control. Nevertheless, in view of variations in the operation of the process, it may be desirable to arrange the hardware for the regeneration section such that a larger quantity of first flue gas is withdrawn and the amount recycled in the process can be adjusted.

There may be several advantages to withdrawing an amount of first flue gas that is larger than the amount of gas that will be rejected from the process. One advantage is that such an arrangement may maximize the effectiveness of the invention without over complicating the equipment for flue gas withdrawal. Since initiation of burning generally takes some time within the combustion section, the maximum region of water generation for the bed may occur at a slight distance from the point where catalyst particles enter the combustion section. As a result, recycle gas that passes through and is withdrawn from the extreme inlet end of the first portion of the second elongated side where burning has not initiated may have a lower moisture content than the flue gas withdrawn from a slightly downstream part of the first portion of the second elongated side. However, in order to simplify the apparatus, flue gas from the first point where catalyst particles enter the bed down to a point where hydrogen combustion is reduced can be withdrawn in a first flue gas stream.

Where first flue gas in excess of the amount of flue gas rejected is withdrawn, further process advantages may be achieved by adding drying equipment. As previously stated, it is impractical to dry the entire recirculating stream of flue gas and recycle gas. However, the amount of first flue gas that is not rejected from the process represents a relatively small volume of the recycle gas stream. Drying only this portion of the first flue gas stream and returning it to the recycle loop offers a more cost effective arrangement for the utilization of drying equipment.

This stream of dried first flue gas, where combined with the first make-up gas stream, can be used in effect to reduce the oxygen concentration of the first make-up gas entering the process. In the past, the first make-up gas was typically air and the amount of air needed to replenish the oxygen consumed during the coke combustion was relatively small, about 3% of the volumetric rate of the recycle gas stream. Where the oxygen concentration of the first make-up gas is reduced, however, a larger volumetric rate of first make-up gas is needed to replenish the oxygen consumed during the coke combustion. As a result, additional first flue gas can be rejected from the process and thereby the equilibrium water concentration in the recycle loop can be further reduced. Where the first flue gas stream that is rejected from the process is used as part of the first make-up gas stream, it is also desirable to treat it for the removal of chlorides and sulfur compounds before it is compressed, dried and mixed with air to provide the first make-up gas stream.

Whether supplied as part of the rejected first flue gas stream or obtained from another source, the use of an oxygen-deficient gas stream as the first make-up gas offers a number of advantages to the regeneration process. As previously stated for the second make-up gas, by decreasing the concentration of oxygen in the make-up gas a larger quantity of second make-up gas must be added to the process in order to maintain a given oxygen concentration in the first combustion zone. By analogy between the first and second combustion zones, this applies to the first make-up gas as well. The addition of more first make-up gas requires the rejecting of more flue gas. Since the water concentration in the first make-up gas is lower than the rejected flue gas, an increase in the amount of flue gas rejected decreases the water concentration in the recycle gas loop. For example, reducing the oxygen concentration in the first make-up gas from the usual 21% oxygen found in air to about 7% will allow a three-fold increase in the amount of first make-up gas added to the recycle gas and rejected from the flue gas and consequently a three-fold reduction in recycle gas moisture.

Suitable make-up gas streams having an oxygen content less than air can be obtained by a variety of methods. A typical first make-up gas stream for this invention will have a maximum oxygen concentration of from 10 to 12% by mol and preferably will have an oxygen concentration of less than 7 mol %. As mentioned previously, a number of commercially available and economical processes are known for enriching air streams with oxygen or nitrogen. Nevertheless, the method of producing an oxygen-deficient first make-up gas stream using the rejected first flue gas is probably the simplest. The first flue gas that is rejected consists of nitrogen, carbon dioxide, water vapor, oxygen, hydrogen chloride, chlorine and sulfur dioxide; its temperature is in excess of 900° F. (480° C.). Wet scrubbing can be used to remove the chlorides and $SO_2$. In fact, it is already common practice in some regeneration zones to remove the chlorides and sulfur compounds from the rejected flue gas by wet scrubbing. Additionally, once a scrubber is in place, the flue gas exiting the scrubber is near ambient temperature, and is easily recompressed, dried and combined with the first make-up gas stream. Mixing a treated flue gas stream with the first make-up gas can be more cost-effective, from the standpoint of both energy and capital, than using an oxygen/nitrogen membrane for producing the oxygen-deficient gas stream. The advantages of using a treated flue gas stream are most evident in regeneration zones that operate at superatmospheric pressure where the higher pressure, usually in the range of 15 to 50 psi, reduces the concentration of water in the flue gas as it exits the scrubber.

When using the method of this invention, there is a significant and beneficial synergism among the various means for reducing the water concentration during the combustion of coke. By selectively combusting a relatively large proportion of the hydrogen-rich coke at first combustion conditions, the benefits associated with precluding substantial contact of the second flue gas stream with the first flue gas stream, rejecting all of the first flue gas stream, and employing an oxygen-deficient first make-up gas are dramatically improved. In a typical regeneration process of the prior art, employing an oxygen deficient first make-up gas to increase the flow rate of make-up gas can reduce the water concentration during the combustion of coke by about 50%. When a relatively large proportion of the hydrogen-rich coke is combusted at first combustion conditions and the first flue gas stream is rejected from the process, the water concentration can be reduced by 25-50%. The effect of increasing the proportion of hydrogen-rich coke that is burned at first combustion conditions is a multiplicative—rather than simply an additive—beneficial effect. Given enough combustion of hydrogen-rich coke in the first portion of the combustion section and enough diluting make-up gas added to the second portion of the combustion section, the water concentration during the combustion of coke can be reduced to 1-2 mol percent. As stated previously, such a reduction affords significant benefits. For example, decreasing the water concentration from 5% to 2% by mol will increase the surface area life of the catalyst by three times when used in a 1200° F. combustion section at 0 psig.

Below the combustion section, the regeneration zone will usually include additional treatment steps for the catalyst. One such step is a halogenation step. The halogenation step provides the means of incorporating and maintaining the desired level of halogen in the final catalytic composite. The halogen adjustment step employs a halogen, or halogen-containing compound in air or an oxygen atmosphere. The preferred halogen for incorporation into the catalytic composite is chlorine. The preferred halogen or halogen-containing compound utilized during the halogenation step is chlorine, HCl or a precursor of these compounds. An oxygen atmosphere is generally employed and desired in carrying out the halogenation step. The presence of oxygen aids in the dispersion of the metallic catalyst components on the carrier. A lower water concentration in the environment of the combustion section can facilitate the halogenation step as catalyst with a lower water content drops downward into the halogenation section of the regeneration zone. The concentration of chlorine in the halogenation section is governed by the Deacon equilibrium equation.

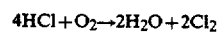

$$4HCl + O_2 \rightarrow 2H_2O + 2Cl_2$$

Therefore, to the extent that the catalyst entering the halogenation section has a lower water concentration it will shift the equation to the right to produce more chlorine for the halogenation step. Since oxygen aids in the redispersion of platinum, additional benefits are obtained by the method of this invention when the production of the oxygen-deficient first make-up gas stream also produces an oxygen-enriched stream that may be passed into the halogenation section to increase the oxygen concentration and further promote the dispersion of the catalytic metal on the carrier. However, when an oxygen-enriched gas is introduced into the halogenation section, it must not be vented through the combustion section; to do so would increase the oxygen concentration in the recycle gas and negate the effects of the oxygen-deficient first make-up gas.

After passing to the combustion section and halogenation section, the catalyst is usually passed into a drying section for the removal of water formed in the combustion section and remaining on the catalyst particles. The typical arrangement for drying the particles charges a heated air stream into the drying section of the regeneration zone and contacts the particles in countercurrent flow. Relatively dry catalyst particles are withdrawn from the bottom of the regeneration zone and the water-containing oxygen gas stream flows upward out of the drying section.

The water-laden gas stream usually enters the halogenation section to supply the desired oxygen in the combustion section. Gas from the drying section and halogen-containing gas mix in the halogenation section and can either flow upward into the combustion section or be removed prior to entering the combustion section. Since the gas from the halogenation section will usually contain a relatively large water concentration, it is desirable to separately withdraw this gas stream before it enters the combustion section.

As mentioned previously, the coke content of the combusted catalyst exiting the combustion section is approximately 0.2% or less of the weight of the catalyst. Much of this residual coke is burned off in the halogenation section or, if the halogenation section is omitted, in the drying section. Were catalyst leaving the combustion section to have on it a larger amount of coke, the temperature in the section below the combustion section would rise to an unacceptably high value, as a result of the heat of combustion.

The simple and effective water removal method of this invention allows the regeneration zone to be operated more profitably. The presence of moisture in the combustion section decreases the catalyst surface area and shortens its life, thereby creating higher catalyst replacement cost. The small cost associated with addition of equipment for operating first and second combustion conditions and for isolating high moisture content flue gas is much smaller than the cost associated with catalyst replacement. Therefore, in balance, the overall cost for the regeneration process are reduced. Further cost advantages are realized when an oxygen-enriched stream is produced along with the oxygen-deficient first make-up gas stream so that water removal and conditioning of the catalyst in the halogenation section is enhanced.

FIGS. 1–3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into a regeneration vessel 56 by means of particle inlet conduit nozzles 66. Catalyst is removed from the regeneration vessel 56 at the lower end through a nozzle 10. The regeneration vessel 56 has an upper section 30 and a lower section 18. The regeneration vessel is cylindrical in form.

From the upper section 30 of the regeneration vessel 56, first flue gas leaves through nozzles 70 and second flue gas leaves through a nozzle 68. First flue gas exiting through the nozzles 70 is rejected from the process by a pipeline 92. Second flue gas exiting through the nozzle 68 is conveyed to a blower 96 by a pipeline 94. Second flue gas leaves the blower 96 through a pipeline 98. First make-up gas is heated by passage through a heater 104 and added to the second flue gas by a pipeline 100. The heater 104 heats the recycle gas to carbon-burning temperatures during start-up and to a lesser degree adds heat to the recycle gas stream during normal operation. It should be noted that FIG. 1 shows the heater 104 in a location that corresponds to a preferred arrangement for operation with an oxygen-deficient first make-up gas stream. In other arrangements, particularly those without an oxygen-deficient first make-up gas stream, the heater is usually located in the recycle loop. Once the first make-up gas is added to the second flue gas, the combined gas stream is usually denoted "recycle gas." Recycle gas enters a cooler 106 through a pipeline 102. The cooler 106, which to a degree removes heat from the recycle gas stream during normal operation, operates in conjunction with the heater 104 to regulate the heat content of the recycle gas.

Recycle gas exits the cooler 106 through a pipeline 111. A first portion of the recycle gas stream passes through a pipeline 108. Air from the atmosphere is drawn through a filter 101 and a pipeline 103 by a blower 105. The air stream provides second make-up gas which is added through a pipeline 109 to a first portion of the recycle gas stream, and the combined gas stream passes through a pipeline 107 and enters the regeneration vessel through an upper or first recycle gas inlet nozzle 62. It should be noted that FIG. 1 shows no means for heating the second make-up gas stream, which corresponds to a preferred arrangement of operation having a lower temperature in the upper or first portion of the catalyst particle bed in the combustion section than in the lower or second portion of the catalyst particle bed in the combustion section. In other arrangements, particularly those having a significant flow rate of second make-up gas relative to the first portion of the recycle gas stream, means for heating the second make-up gas stream may be located downstream of the blower 105 in order to maintain a minimum temperature in the first portion of the catalyst particle bed in the combustion section. A second portion of the recycle gas stream passes through a pipeline 113 and enters the regeneration vessel 56 through a lower or second recycle gas inlet nozzle 44. The pipelines 94, 98, 102, 111, and 113 together with a hereinafter described combustion section form a recycle loop.

A gas separation system 114 supplies first make-up gas to the recycle loop. Air enters the gas separation system 114 by a pipeline 112. The separation system 114 produces an oxygen-deficient gas stream, carded by a pipeline 110 and an oxygen-enriched gas stream carried by a pipeline 116. The total volumetric rate of first make-up gas and second make-up gas added to the process is generally equal to the amount of gas rejected from the process through the pipeline 92.

FIG. 1 also depicts a halogenation loop for performing the halogenation step. A halogenation gas stream is provided to the halogenation section of the regeneration vessel 56 by a halogenation nozzle 20. The halogenation gas exits the regeneration vessel 56 through a nozzle 74 and is conveyed to a heater 88 by pipelines 78, 82 and 86 and by a blower 80. Make-up halogen is added to the halogenation gas by a pipeline 84. After the halogenation gas is heated, it passes through a pipeline 90 and the halogenation nozzle 20 to the upper section 30 of the regeneration vessel 56. In a manner hereinafter described, the halogenation gas is kept separate from the first flue gas, second flue gas and recycle gas until removed from the regeneration vessel 56 by the nozzle 74. Gas is vented from the halogenation loop by a pipeline 76.

Air from the atmosphere is drawn through a filter 118 and a pipeline 120 by a blower 122. An oxygen-enriched stream from the pipeline 116 is also drawn into the pipeline ! 20. The oxygen-enriched stream and the air stream provide a drying gas that passes from the blower 122 through a pipeline 124 and into a dryer 126 for water removal before entering a heater 130 via a pipeline 128. The air stream is heated in the heater 130 and passed into the lower section 18 of the regeneration vessel 30 via a pipeline 132 and a nozzle 14. Drying gas is combined with gas from the halogenation loop and eventually exits the process through the pipeline 76.

Referring now to FIG. 2, outer and inner particle retention screens 28 and 26 extend vertically within the upper section 30 of the regeneration vessel 56. The screens 28 and 26 together provide an inlet particle retaining member and an outlet particle retaining member. The outer screen 28 and the inner screen 26 are cylindrical in form. The two catalyst retention screens have a central axis common with the central axis of the regeneration vessel. The screens 28 and 26 are vertically coextensive and offset horizontally to form a particle retaining space that is vertically extending and through which a descending annular column of catalyst particles shown as a catalyst particle bed 32, moves by gravity. Particle inlet conduit nozzles 66 deliver catalyst at points spaced around the annular catalyst particle bed 32. The catalyst retention screens 28 and 26 provide perforated walls having openings sufficiently small to preclude catalyst particles from passing therethrough, but allowing gas flow. For a description of catalyst retention means, U.S. Pat. No. 3,652,231 may be consulted. The catalyst retention screens extend throughout the upper section 30 of the regeneration vessel 56 and deliver catalyst to the lower section 18 of regeneration vessel 56.

The portion of the upper section 30 of the regeneration vessel 56 which is above a lower outer horizontal partition 40 is termed a combustion section. The portion of the combustion section which is above an upper outer horizontal partition 54 is termed an upper or first portion of the combustion section and the portion of the combustion section which is below the upper outer horizontal partition 54 is termed a lower or second portion of the combustion section. A space for distributing recycle gas around the catalyst particle bed 32 provides a distributor and is formed between the outer screen 28 and the sidewall of the regeneration vessel 56 in the upper section 30 and is divided by the partitions 40 and 54. The partition 54 forms a barrier between an upper or first gas distribution chamber 53 and a lower or second gas distribution chamber 42. The partition 54 is typically a horizontal circular baffle that extends from the sidewall of the regeneration vessel 56 to the outside of the outer screen 28 and that is located within the upper third of the outer screen 28. The partition 40 forms a barrier between the second gas distribution chamber 42 and a halogenation gas distribution chamber 36. Recycle gas enters the first gas distribution chamber 53 through the first recycle gas nozzle 62, and recycle gas enters the second gas distribution chamber 42 through the second recycle gas nozzle 44. A partition 64 provides a top closure for the first gas distribution chamber 53. Recycle gas flows radially, or horizontally, from the second gas distribution chamber 42 through the catalyst particle bed 32 to a central space which provides a gas collection chamber termed a second gas collection chamber 38. A halogen conduit 48 occupies a portion of the second gas collection chamber 38. A lower boundary for the second gas collection chamber 38 is provided by an enlarged end 34 of the halogen conduit 48. A central space that provides another gas collection chamber termed a first gas collection chamber 58 is separated from the second gas collection chamber 38 by a partition in the form of an annular plate 50 at the bottom of a conduit 52. The annular plate 50 provides a top closure for the second gas collection chamber 38 and a bottom closure for the first gas collection chamber 58 and divides the central space into two gas collection chambers. The annular plate 50 is typically a horizontal circular baffle that extends from the conduit 52 to the inside of the inner screen 26 and that is located within the upper third of the inner screen 26. The conduits 52 and 48 and the catalyst nozzles 66 pass through partition 64. Conduit 52 is an extension of nozzle 68 that communicates nozzle 68 with second gas collection chamber 38. The halogen conduit 48 extends from nozzle 74 and passes through second gas collection chamber 38.

The upper or first gas collection chamber 58 collects flue gas from the uppermost portion of the catalyst particle bed 32. The partition 64 provides the top closure for the first gas collection chamber 58 and the conduit 52 forms the innermost boundary. The position of the annular plate 50 defines the uppermost open area of the inner screen 26 within the combustion section that borders the first gas collection chamber 58. The length of the first gas collection chamber 58 is sized so that the flow rate of oxygen to and the residence time of the catalyst particles in the particle retaining space above the annular plate 50 is sufficient to ensure that a portion of the hydrogen in the coke is combusted before the catalyst particles pass below the annular plate 50. The length of the first gas collection chamber 58 is also sized so that the gas flow above the annular plate 50 through the outer screen 28, the particle retaining space, and the inner screen 26 is at a rate below that effective to terminate the flow of catalyst particles through the catalyst particle bed 32 by the phenomenon known as "pinning," which is well known to those skilled in the art of gas and particle flow. Although a large benefit in accord with the present invention can be achieved with the annular plate 50 positioned near the enlarged end 34 of the halogen conduit 48, so that the length of the first gas collection chamber 58 is maximized and the length of the second gas collection chamber 38 is minimized, such an arrangement would result in once-through flow of a large proportion of the recycle gas through the combustion section and the concomitant need for a large flow rate of make-up gas. The first gas collection chamber 58 collects the flue gas having the higher water content than the flue gas collected by the lower or second gas collection chamber 38. This high moisture content flue gas stream is termed the first flue gas stream and is withdrawn from the first gas collection chamber 58 by the nozzles 70 that pass through the partition 64 and communicate with the first gas collection chamber 58.

The portion of the upper section 30 of the regeneration vessel 56 that is located below the partition 40 is termed a halogenation section. A halogen-containing gas enters the halogenation section via the halogenation nozzle 20, flows into the halogenation gas distribution chamber 36, and then flows through the catalyst in a radial manner before entering a halogenation gas collection chamber 24. A lower boundary of halogenation gas distribution chamber 36 is formed by a necked-down portion of the regeneration vessel 56 at the bottom of the upper section 30. The end closure or enlarged end 34 of the halogen conduit 48 forms the upper boundary and an end closure 22 forms the lower boundary of the halogenation gas collection chamber 24. The outer edges of the enlarged end 34 are positioned close to inner screen 26 to prevent the moisture-rich and high-oxygen concentration gas in the halogenation section from mixing with the second flue gas in the second gas collection chamber 38.

The outer screen 28 extends a short distance into the lower section 18 of the regeneration vessel 56, which is of a smaller diameter than the upper section 30. The outside diameter of the outer screen 28 is slightly smaller than the inside diameter of the lower section 18. Catalyst discharged from the catalyst particle bed 32 fills all of the lower section 18 of the regeneration vessel 56 and forms a catalyst particle bed 16 that provides a drying section. Catalyst moves downward as a cylindrical column of catalyst through the lower section 18 of the regeneration vessel 56 and out of the regeneration vessel 56 through the catalyst outlet nozzle 10.

The nozzle 14 on the regeneration vessel 56 is equipped with means for distributing air, consisting of a perforated pipe 12, to various points in a horizontal plane which is perpendicular to the descending catalyst. The pipe 12 distributes air uniformly up the cylindrical column of catalyst so that it contacts all of the catalyst in the catalyst particle bed 16.

Air entering the regeneration vessel 56 via the pipe 12 has been dried so that it contains no more than about 5 parts per million (by volume) of water and has also been heated. The hot air passes upwardly through the catalyst particle bed 16 removing moisture which is contained on the catalyst. Essentially all of the air moving up the cylindrical column of catalyst in the lower section 18 passes into the halogenation gas collection chamber 24. The air stream from the drying section mixes with gas which has passed through the catalyst from the halogenation gas distribution chamber 36 to the halogenation gas collection chamber 24 and the combined stream enters the halogen conduit 48 to flow out of the regeneration vessel 56 via the halogen nozzle 74. The regeneration vessel 56 is designed so that substantially all of the gas in the halogenation gas collection chamber 24 enters the halogen conduit 48. By substantially it is meant that between 80 and 100% of the air from the halogenation gas collection chamber 24 enters the halogen conduit 48. In the embodiment of FIG. 2, this is accomplished by the enlarged end 34.

FIG. 3 depicts a portion of the conduit and screen arrangements. The halogen conduit 48 having an interior 46 and the conduit 52 are centered on the vertical axis of the regeneration vessel 56. The particle retention screens 28 and 26 enclose the downward-moving catalyst particle bed 32. Gas in the first gas distribution chamber 53 flows radially through the catalyst to the first gas collection chamber 58.

The regeneration zone can be designed so that a portion of halogenation gas which passes through the bed in the halogenation section enters the second gas collection chamber 38, by placing the enlarged end 34 of the halogen conduit 48 below the partition 40. In this way, gas passing through the catalyst in the halogenation section can provide some of the oxygen for combustion of carbon on catalyst in the combustion section and then mix with the portion of upwardly flowing gas from the halogenation section that did not enter the halogen conduit 48. Of course, the amount of such gas should be limited so that most of the oxygen for combustion is provided by the addition of make-up gas through the pipelines 100 and 109.

For a typical combustion section of a regeneration zone, the rate of catalyst movement through a 6 inch (15.2 cm) constant-width bed or a tapered bed varying from a 3 inch (7.6 cm) thickness to a 9 inch (22.9 cm) thickness may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accommodate a 36 inch flue gas pipe. Where larger catalyst movement rates are required, bed thickness may be increased. For example, for a 2000 pound per hour (907.2 kg) catalyst flow rate, a constant-width bed may be 9 inches (22.86 cm) thick. Bed length will be about 13 feet (5.15 m).

The description of this invention in the context of a preferred regeneration arrangement is not intended to limit its application to the details shown therein. The method of this invention can be used advantageously to control the water content in a recirculating gas stream for any oxygen-consuming process that produces water.

What is claimed is:

1. A method of reducing the water concentration during the combustion of coke in a process for removing coke from catalyst particles in a combustion section of a regeneration zone through which said catalyst particles move in at least semi-continuous flow, said method comprising:

a) passing catalyst particles containing coke deposits into said regeneration zone and withdrawing regenerated catalyst particles from said regeneration zone;

b) forming in a combustion section of said regeneration zone an elongated bed of said catalyst particles having an inlet end where catalyst particles containing coke deposits enter said bed, an outlet end where regenerated catalyst particles are withdrawn from said bed after the combustion of coke from said particles, and a first and a second elongated side open for transverse gas flow through said bed;

c) at least periodically moving said catalyst particles through said bed by withdrawing regenerated catalyst particles from said outlet end of said bed and adding catalyst particles containing coke deposits to said inlet end of said bed;

d) separating a recycle gas stream comprising oxygen and $CO_2$ into a first portion and a second portion of said recycle gas stream:

e) passing said first portion of said recycle gas stream through a first portion of said first elongated side located between said elongated side and a second portion of said first elongated side and through said bed at first combustion conditions effective to combust at least a portion of the hydrogen contained within the entering coke deposits and produce a first flue gas stream comprising by-products of coke combustion including water, passing said first flue gas stream out of said bed through a first portion of said second elongated side, and withdrawing said first flue gas stream from said regeneration zone;

f) passing said second portion of said recycle gas stream through said second portion of said first elongated side located between said first portion of said first elongated side and said outlet end of said first elongated side and through said bed at second combustion conditions effective to combust at least a portion of the entering coke deposits and produce a second flue gas stream comprising by-products of coke combustion including $CO_2$, passing said second flue gas stream out of said bed through a second portion of said second elongated side, and withdrawing said second flue gas stream from said regeneration zone without substantial contact with said first flue gas stream;

g) rejecting at least a portion of said first flue gas stream from said process; and h) combining at least a portion of said second flue gas stream with a first make-up gas stream comprising oxygen to provide at least a portion of said recycle gas stream.

2. The method of claim 1 where all of said first flue gas stream is rejected from said process.

3. The method of claim 1 further characterized in that said first portion of said first elongated side and said second portion of said first elongated side comprise all of said first elongated side in said combustion section of said regeneration zone.

4. The method of claim 1 further characterized in that said first flue gas stream is from about 5 to about 30% by weight of the total of the flue gas withdrawn from said regeneration zone.

5. The method of claim 1 further characterized in that all of said first flue gas stream is rejected from said process and all of said second flue gas stream is combined with said first make-up gas stream to form said recycle gas stream.

6. The method of claim 1 further characterized in that said first flue gas stream is withdrawn from said inlet end, with respect to the entering catalyst particles, of said bed in said combustion section.

7. The method of claim 1 further characterized in that said second flue gas stream is withdrawn from said outlet end, with respect to the entering catalyst particles, of said bed in said combustion section.

8. The method of claim 1 further characterized in that less than all of said first flue gas stream is rejected from said process and the unrejected portion of said first flue gas stream is treated to remove at least one of chloride compounds and sulfur compounds and combined with said second flue gas stream to provide a portion of said recycle gas.

9. The method of claim 1 further characterized in that less than all of said first flue gas stream is rejected from said process and the unrejected portion of said first flue gas stream is dried to remove moisture and combined with said second flue gas stream to provide a portion of said recycle gas.

10. The method of claim 1 further characterized in that said first make-up gas stream has an oxygen concentration less than ambient air.

11. The method of claim 1 further characterized in that in Step e) at least one of said first portion of said recycle gas stream and a second make-up gas stream comprising a diluent passes through said first portion of said first elongated side.

12. The method of claim 11 further characterized in that said second make-up gas stream has an oxygen concentration essentially the same as ambient air.

13. The method of claim 1 further characterized in that a third portion of said recycle gas stream is separated from said recycle gas stream and is passed through a third portion of said first elongated side located between said second portion of said first elongated side and said outlet end of said first elongated side and through said bed at third combustion conditions effective to combust at least a portion of the entering coke deposits and produce a third flue gas stream comprising by-products of coke combustion including $CO_2$ that is passed out of said bed through a third portion of said second elongated side and withdrawn from said regeneration zone without substantial contact with said first flue gas stream and said second flue gas stream.

14. The method of claim 1 further characterized in that said catalyst particles comprise at least one Group VIII metal.

15. The method of claim 14 wherein said catalyst particles comprise platinum.

16. A method of reducing the water concentration during the combustion of coke in a process for removing coke from catalyst particles in a combustion section of a regeneration zone through which said catalyst particles move in at least semi-continuous flow, said method comprising:

a) passing catalyst particles containing coke deposits into said regeneration zone and withdrawing regenerated catalyst particles from said regeneration zone;

b) forming a vertically-elongated bed of said catalyst particles in a combustion section of said regeneration zone having a first and a second transverse gas flow through said bell;

c) at least periodically moving said catalyst particles down said bed by withdrawing regenerated catalyst particles from the bottom of said bed and adding catalyst particles containing coke deposits to the top of said bed;

d) separating a recycle gas stream comprising oxygen and $CO_2$ into a first portion and a second portion of said recycle gas stream;

e) combining said first portion of said recycle gas stream and air and passing the combined stream through a first portion of said first elongated side located below the top of said bed and through said bed at first combustion conditions including a temperature of from about 260° to about 400° C. and an oxygen concentration of from about 0.5 to about 2.0% by mol effective to combust at least a portion of the hydrogen contained within the entering coke deposits and produce a first flue gas stream comprising by-products of coke combustion including water, passing said first flue gas stream out of said bed in said combustion section through a first portion of said second elongated side, and withdrawing said first flue gas stream from said regeneration zone;

f) passing said second portion of said recycle gas stream through a second portion of said first elongated side located below said first portion of said first elongated side and through said bed at second combustion conditions effective to combust at least a portion of the entering coke deposits and produce a second flue gas stream comprising by-products of coke combustion including $CO_2$, passing said second flue gas stream out of said bed through a second portion of said second elongated side, and withdrawing said second flue gas stream from said regeneration zone without substantial contact with said first flue gas stream;

g) rejecting all of said first flue gas stream from said process; and h) combining at least a portion of said second flue gas stream with a make-up gas stream comprising oxygen and having an oxygen concentration less than ambient air to provide at least a portion of said recycle gas stream.

* * * * *

UNITED STATES PATENT AND TRADEMARK OFFICE
CERTIFICATE OF CORRECTION

PATENT NO. : 5,376,607
DATED : December 27, 1994
INVENTOR(S) : Paul A. Sechrist

It is certified that error appears in the above-indentified patent and that said Letters Patent is hereby corrected as shown below:

Column 22, line 24: Insert after "said" --inlet end of said first--.

Column 24, line 10: Insert after "second" -- elongated side open for--, line 11: Change "bell" to --bed--.

Signed and Sealed this

Fourteenth Day of March, 1995

Attest:

BRUCE LEHMAN

Attesting Officer   Commissioner of Patents and Trademarks